US010586509B2

(12) United States Patent
Anderson et al.

(10) Patent No.: US 10,586,509 B2
(45) Date of Patent: Mar. 10, 2020

(54) TECHNIQUES FOR SUPPORTING BRIGHTNESS ADJUSTMENT ACROSS MULTIPLE DISPLAYS

(71) Applicant: Microsoft Technology Licensing, LLC

(72) Inventors: Katie Anderson, Redmond, WA (US); Marcus John Andrews, Bellevue, WA (US); Jocelyn Berrendonner, Kirkland, WA (US); Steven E. Lees, Seattle, WA (US); Kiran Muthabatulla, Sammamish, WA (US); Lukasz Konrad Brodzinski, Seattle, WA (US); Katherine Blair Huffman, Seattle, WA (US); Hideyuki Nagase, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 8 days.

(21) Appl. No.: 15/993,255

(22) Filed: May 30, 2018

(65) Prior Publication Data
US 2019/0189084 A1 Jun. 20, 2019

Related U.S. Application Data

(60) Provisional application No. 62/607,067, filed on Dec. 18, 2017.

(51) Int. Cl.
*G09G 5/10* (2006.01)
*G06F 3/14* (2006.01)
*G09G 5/02* (2006.01)

(52) U.S. Cl.
CPC ............ *G09G 5/10* (2013.01); *G06F 3/1446* (2013.01); *G09G 5/02* (2013.01);
(Continued)

(58) Field of Classification Search
CPC .......... G06F 3/1446; G09G 2320/0626; G09G 2320/0233; G09G 2320/0666; G09G 2370/04; G09G 2300/026
See application file for complete search history.

(56) References Cited

U.S. PATENT DOCUMENTS

| 6,947,017 B1* | 9/2005 | Gettemy | G09G 5/10 |
| | | | 345/63 |
| 2002/0003544 A1 | 1/2002 | Ohtsuka et al. | |

(Continued)

FOREIGN PATENT DOCUMENTS

EP 3010009 A1 4/2016

OTHER PUBLICATIONS

"International Search Report and Written Opinion Issued in PCT Application No. PCT/US18/062686", dated Mar. 19, 2019, 22 Pages.

*Primary Examiner* — Laurence J Lee
(74) *Attorney, Agent, or Firm* — Arent Fox LLP

(57) ABSTRACT

Described are examples for adjusting display level properties across multiple displays. One or more ranges of display brightness capability values that are supported by a given display device can be received for multiple display devices. For each of the multiple display devices, at least a portion of display brightness capability values in the one or more ranges of display brightness capability values can be mapped to selectable brightness levels available in an operating system. One of the selectable brightness levels can be determined as selected via the operating system. For each of the multiple display devices, a corresponding display brightness capability value mapped to the one of the selectable brightness levels can be determined and indicated to each of the multiple display devices, such that the multiple display devices may set different display brightness capability value brightness, but the brightness may be perceptually similar across the display devices.

18 Claims, 5 Drawing Sheets

(52) U.S. Cl.
CPC ............ *G09G 2300/026* (2013.01); *G09G 2320/0233* (2013.01); *G09G 2320/0606* (2013.01); *G09G 2320/0626* (2013.01); *G09G 2320/0666* (2013.01); *G09G 2370/04* (2013.01)

(56) References Cited

U.S. PATENT DOCUMENTS

| | | | |
|---|---|---|---|
| 2010/0117927 A1* | 5/2010 | Amagami | G06F 1/1616 345/1.1 |
| 2011/0242142 A1 | 10/2011 | Hussain et al. | |
| 2011/0310073 A1* | 12/2011 | Nagata | G06F 3/1423 345/207 |
| 2014/0049527 A1* | 2/2014 | Lanzoni | G09G 3/36 345/207 |
| 2016/0019834 A1* | 1/2016 | Hall | G09G 3/3208 345/212 |
| 2016/0133202 A1* | 5/2016 | Saito | H04N 9/12 345/690 |

\* cited by examiner

TECHNIQUES FOR SUPPORTING BRIGHTNESS ADJUSTMENT ACROSS MULTIPLE DISPLAYS

CLAIM OF PRIORITY UNDER 35 U.S.C. § 119

The present Application for Patent claims priority to Provisional Application No. 62/607,067, entitled "TECHNIQUES FOR SUPPORTING BRIGHTNESS ADJUSTMENT OF DISPLAYS" filed Dec. 18, 2017, which is assigned to the assignee hereof and hereby expressly incorporated by reference herein for all purposes.

BACKGROUND

Present computing devices typically include operating system functionality for selecting and/or adjusting brightness level of a display coupled to the computing device, such as a liquid crystal display (LCD) device. The operating system can, based on input from a driver (e.g., based on pressing a physical button on or near the display or an associated computing device), input from a user interface, or input from an application executing on the operating system, allow for adjustment of the brightness level. Typically, the adjusted brightness value is provided to a display driver as a percentage value (e.g., zero to 100, where zero is the minimum brightness support, which may be brightness off and 100 is the maximum supported brightness level, at least for a normal/non-boost mode). Based on the indicated brightness level, the display driver can interpret the percentage value and can determine how to adjust the brightness of the display device. This can result in inconsistency in levels across displays as the equipment manufacturer is tasked with determining brightness levels of the display device to satisfy the brightness level adjustment available at the operating system. This inconsistency can be exacerbated when multiple displays are connected to the same computing device, and are accordingly displaying at different perceived brightness levels. Similar inconsistencies can result from adjusting color level or other display properties.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a method for adjusting display level properties across multiple display devices is provided. The method includes receiving, for each of multiple display devices, one or more ranges of display brightness capability values that are supported by a given display device of the multiple display devices, mapping, for each of the multiple display devices, at least a portion of display brightness capability values in the one or more ranges of display brightness capability values to selectable brightness levels available in an operating system, determining one of the selectable brightness levels selected via the operating system, determining, for each of the multiple display devices, a corresponding display brightness capability value mapped to the one of the selectable brightness levels, and indicating, to each of the multiple display devices, the corresponding display brightness capability value.

In another example, a device for adjusting display level properties across multiple display devices is provided. The device includes a memory storing one or more parameters or instructions for adjusting the display level properties, and at least one processor coupled to the memory. The at least one processor is configured to receive, for each of multiple display devices communicatively coupled to the device, one or more ranges of display brightness capability values that are supported by a given display device of the multiple display devices, map, for each of the multiple display devices, at least a portion of display brightness capability values in the one or more ranges of display brightness capability values to selectable brightness levels available in an operating system, determine one of the selectable brightness levels selected via the operating system, determine, for each of the multiple display devices, a corresponding display brightness capability value mapped to the one of the selectable brightness levels, and indicate, to each of the multiple display devices, the corresponding display brightness capability value.

In another example, a computer-readable medium, including code executable by one or more processors for adjusting display level properties across multiple display devices. The code includes code for receiving, for each of multiple display devices, one or more ranges of display brightness capability values that are supported by a given display device of the multiple display devices, mapping, for each of the multiple display devices, at least a portion of display brightness capability values in the one or more ranges of display brightness capability values to selectable brightness levels available in an operating system, determining one of the selectable brightness levels selected via the operating system, determining, for each of the multiple display devices, a corresponding display brightness capability value mapped to the one of the selectable brightness levels, and indicating, to each of the multiple display devices, the corresponding display brightness capability value.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

Figure 1:
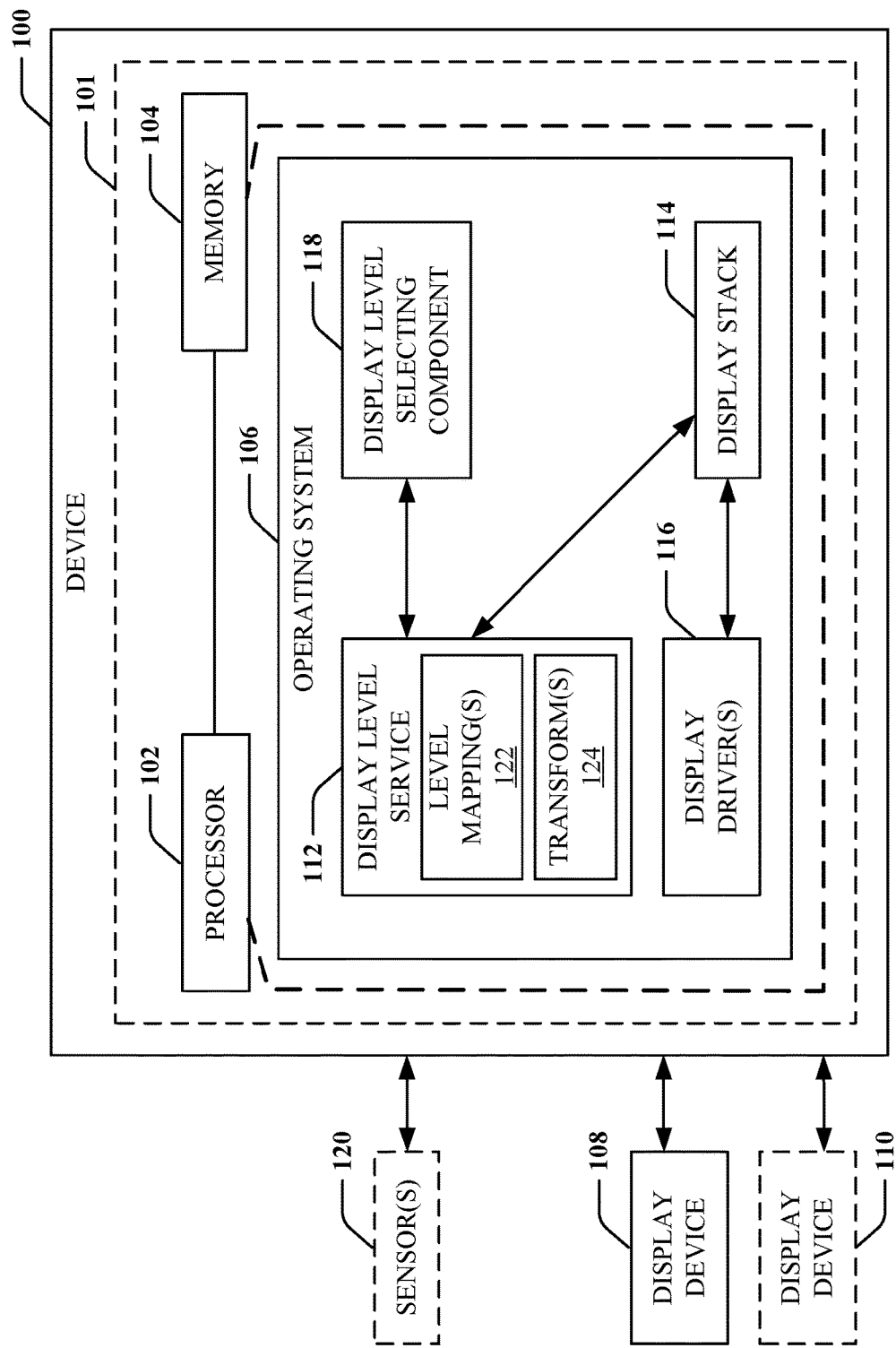
FIG. 1 is a schematic diagram of an example of a device that can set display level properties of multiple displays in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing brightness level adjustment of display devices at the operating system of a computing device based on display brightness capability values to facilitate consistent perceptual brightness levels at multiple display devices. The display devices can be configured to display brightness at various levels of display brightness capability values. The capability values can include a measurement of how much light the display device emits within a given area, and can be measured in nits, candelas (cd) per square meter ($m^2$) (e.g., one nit=1 $cd/m^2$), etc. For example, a display device can provide one or more supported ranges of display brightness capability values (e.g., as measured in nits or other units, such as millinits) to the operating system, and the operating system can map selectable brightness levels to values in the one or more supported ranges. In this regard, given a selected brightness level at the operating system, the operating system can determine the corresponding display brightness capability value, and provide the display brightness capability value to the display driver for adjusting brightness of the corresponding display device. For example, using a nits-based brightness level adjustment can provide a physical brightness level adjustment, as opposed to a relative brightness level adjustment that can be interpreted differently by different display devices.

In one example, the operating system can map similar display brightness capability values provided in ranges from different display devices to the selectable brightness levels, though the supported ranges of values of the display devices may be different, in an attempt to provide consistency in perceptible brightness levels across the different display devices, though the actual brightness values may not match. This can be especially desirable where the display devices are coupled to the same computing device and/or are otherwise configured near one another.

In addition, for example, a measure of ambient light at or near the display device may be considered, or otherwise factored, in transforming the ranges of display brightness capability values mapped to the selectable brightness levels. In an example, the display device and/or computing device may include an ambient light sensor configured to determine the measure of ambient light, and may provide the measure for generating the nits transform to be used in determining the mapping of the display brightness capability values to the selectable brightness levels. In general, for example, for higher levels of ambient light, values in the higher ranges of display brightness capability values can be mapped to the selectable brightness levels of the operating system. In one example, a detected change in ambient light can cause the operating system to determine a different display brightness capability value in one of the ranges of display brightness capability values based on the change in ambient light, and can provide the different display brightness capability value to the display driver for causing adjustment of the brightness level of the display device. Moreover, for example, multiple display devices situated near one another may have different detected ambient light values, and may thus determine different actual brightness values that allow for a similar perceptible brightness across the displays given the ambient light.

Figure 2:
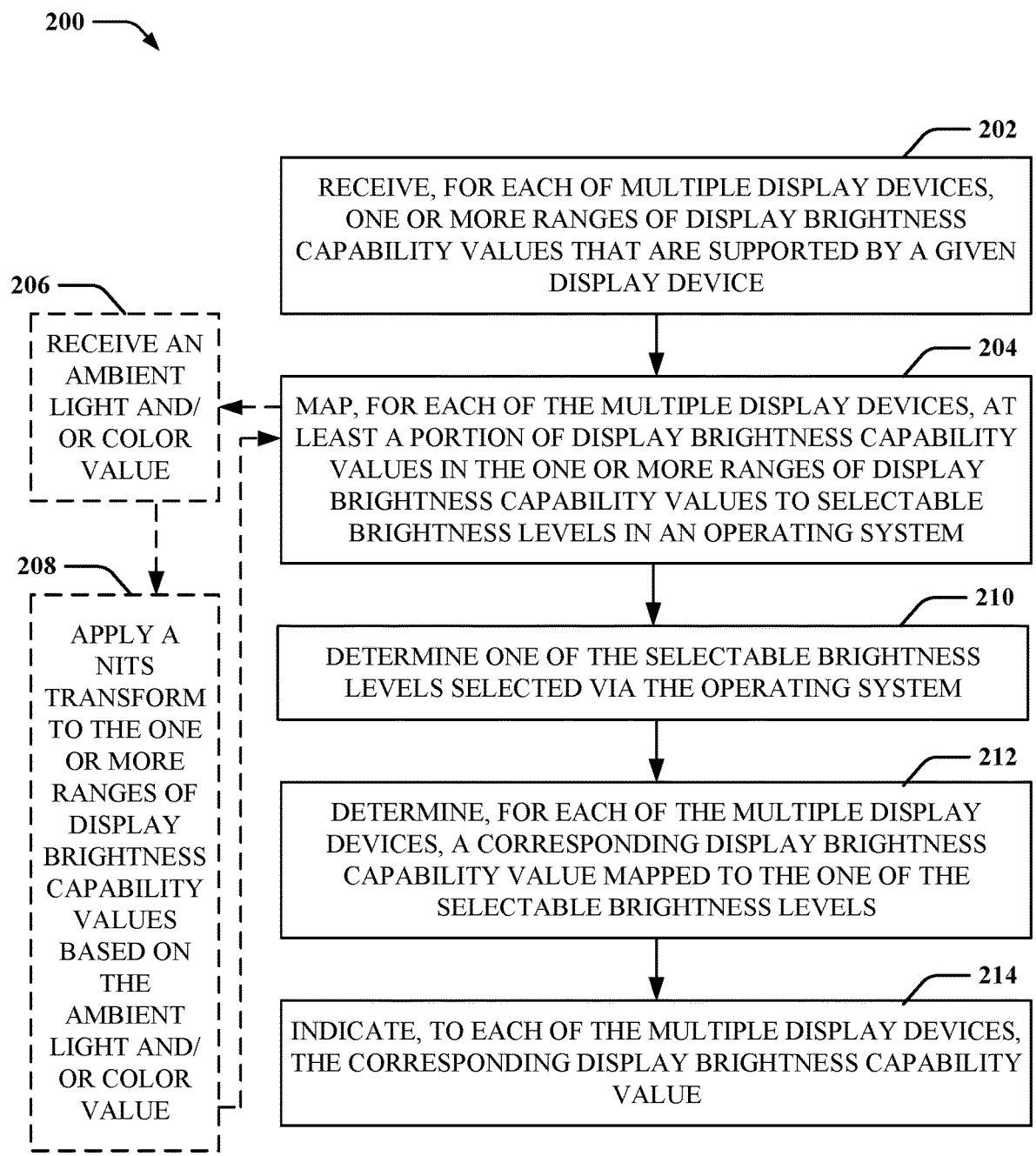
FIG. 2 is a flow diagram of an example of a method for setting a brightness level for multiple displays in accordance with examples described herein.
Figure 3:
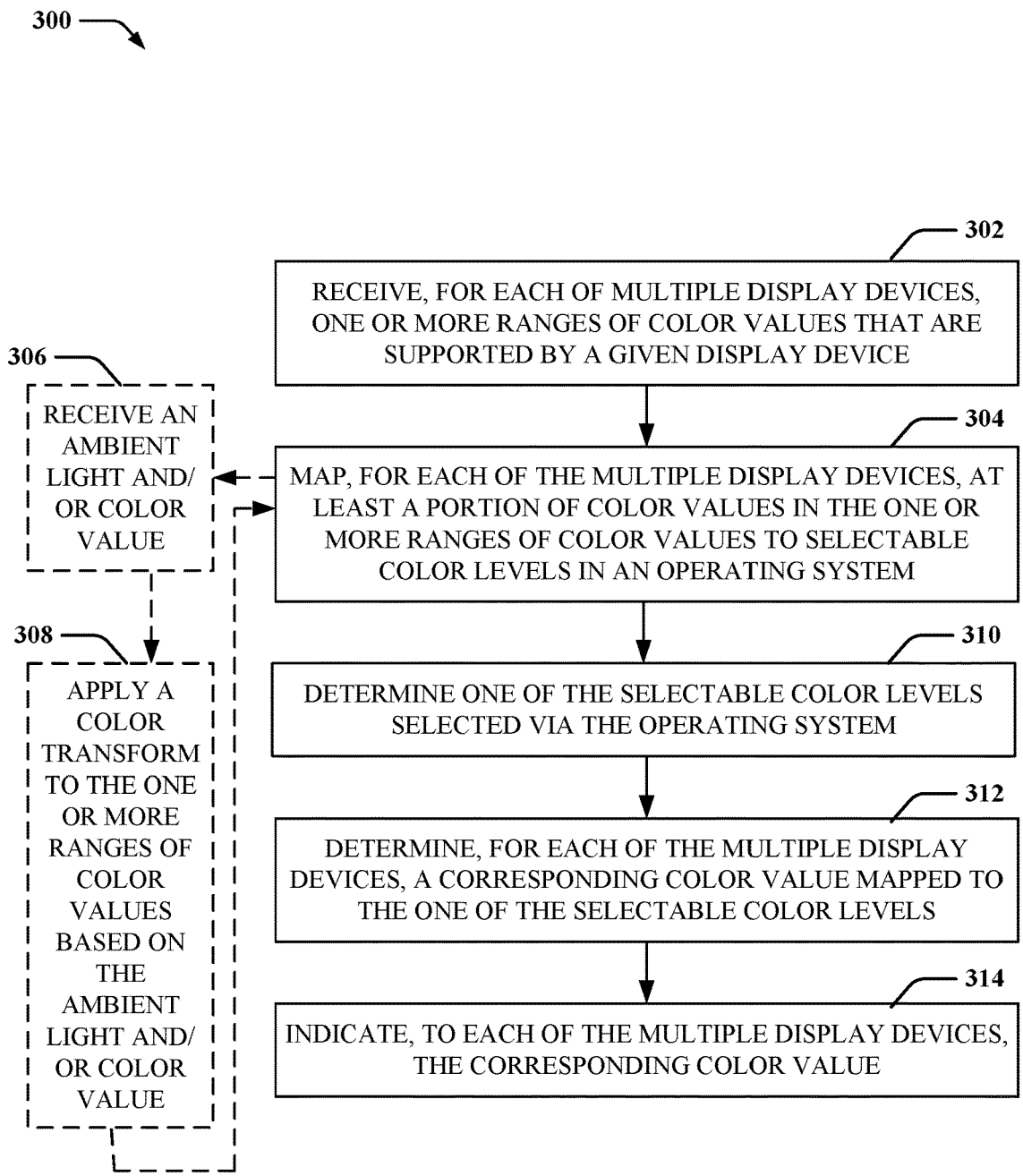
FIG. 3 is a flow diagram of an example of a method for setting a color level for multiple displays in accordance with examples described herein.

Turning now to FIGS. 1-5, examples are depicted with reference to one or more components and one or more methods that may perform the actions or operations described herein, where components and/or actions/operations in dashed line may be optional. Although the operations described below in FIGS. 2 and 3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can set display level settings, such as brightness, color, etc., based on capabilities supported by one or more displays. In an example, device 100 can include a processor 102 and/or memory 104 configured to execute or store instructions or other parameters related to providing an operating system 106, which can execute one or more applications, services, etc. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein.

In addition, for example, device 100 may be communicatively coupled to one or more display devices 108, 110, which may include liquid crystal display (LCD) devices, light emitting diode (LED) LCD devices (e.g., having an LED backlight), digital light processing (DLP) display, or substantially any display with adjustable display levels (e.g., adjustable brightness level, color level, and/or the like), etc. The display device(s) 108, 110 can display images generated and provided by the device 100 via operating system 106, applications executing thereon, etc., as described further herein.

The one or more applications, services, etc. executing on the operating system 106 may include a display level service 112 for specifying one or more display parameter levels (e.g., brightness level, color level, etc.) or other display properties to a display stack 114, which processes display commands for providing to one or more of the display devices 108, 110, one or more display drivers 116 for communicating display commands to the display devices 108, 110 (e.g., over a display interface, display port, or other hardware communication interface, which are not shown), and/or a display level selecting component 118 for facilitating display level parameter selection. As described further herein, display level selecting component 118 can allow at least one of a manual selection of a display parameter level via an interface provided on operating system 106 or one or more applications, services, etc., or an automatic selection of the display parameter level via one or more instructions from operating system 106 or one or more applications, services, etc. (e.g., based on an ambient light and/or color sensor input). In this regard, device 100 may also be communicatively coupled to one or more sensors 120, which may include an ambient light sensor, an ambient color sensor, etc., for indicating environmental parameters to the device 100 for selecting a display parameter level.

In an example, display level service 112 can specify a nits-based brightness level, a color level, etc. to one or more of the displays 108, 110 via display stack 114, which can send associated instructions to the corresponding display driver(s) 116. In this example, the display driver(s) 116 can cause or otherwise instruct associated displays 108, 110 to change brightness level (and/or other settings on the display 108, 110). In one example, display driver(s) 116 can indicate one or more ranges of nits-based brightness levels supported by the one or more display devices 108, 110, one or more ranges of color levels supported by the one or more display devices 108, 110, etc., and/or the like. Display level service 112 can receive the one or more ranges of nits-based brightness levels, color levels, etc., and can generate one or more level mappings 122 to associate, for each display device 108, 110, values in the one or more ranges of nits-based brightness levels with selectable brightness levels in the operating system, and/or values in the one or more ranges of color levels with selectable color levels in the operating system, etc. Display level selecting component 118 can allow for manual or automatic selection of the selectable brightness level, color level, etc. The display level service 112 can accordingly select a nits-based brightness level, color level, etc., based on the one or more level mappings 122 for setting by the one or more displays 108, 110, which can be one of the level mappings 122 determined for the one or more displays 108, 110 based at least in part on the information received from the associated display driver(s) 116.

In addition, for example, display level service 112 can generate one or more transforms 124 based on input from one or more sensors 120 to convert at least one of the level mappings 122, the level(s) selected based on the level mappings 122, etc. For example, sensor(s) 120 may include an ambient light sensor that determines and indicates an ambient light level, an ambient color sensor that determines and indicates an ambient color level, etc. In this example, display level service 112 can receive an ambient light level and/or ambient color level from the sensor 120, and can generate an associated nits-based brightness transform 124 that transforms the level mapping(s) 122 (or associated determined nits-based brightness level) based on the ambient light level and/or ambient color level. For example, for more ambient light, display level service 112 can generate a transform that increases the nits-based brightness level over that specified in the level mapping(s) 122. In another example, display level service 112 generate an associated color transform 124 that transforms the level mapping(s) 122 (or associated determined color level) based on the ambient light level and/or ambient color level. In either example, a selected brightness and/or color level indicated by display level selecting component 118 can be associated with a nits-based brightness level or color level supported by the display device(s) 108, 110 based on the level mapping(s) 122, as transformed by one or more transforms 124 or otherwise.

FIG. 2 is a flowchart of an example of a method 200 for adjusting a brightness level of one or more display devices. For example, method 200 can be performed by a device 100, and/or one or more components thereof, to adjust the brightness level of one or more display devices 108, 110. Moreover, though generally described in terms of multiple display devices herein, device 100 can similarly perform the functions described below for a single display device. In addition, in an example, a given display device may have multiple display panels, and the device 100 can perform the functions described below for each of the multiple display panels.

In method 200, at action 202, for each of multiple display devices, one or more ranges of display brightness capability values that are supported by a given display device can be received. In an example, display level service 112, e.g., in conjunction with processor 102, memory 104, operating system 106, etc., can receive (e.g., from display driver 116), for each of the multiple display devices (e.g., display devices 108, 110), the one or more ranges of display brightness capability values (e.g., nit values) that are supported by a given display device. For example, a display driver 116 for a given display device may indicate one or more ranges of display brightness capability values supported by a corresponding display device 108 (or 110), which may be in units of millinits. The one or more ranges may include a linear range, multiple piecewise linear ranges, etc. Moreover, the one or more ranges can define a normal operating mode for the display devices 108, 110, and/or a boost operating mode for the display devices 108, 110, where the boost operating mode may be used in extreme circumstances (e.g., detecting direct sunlight) and/or may be configured by the operating system 106 and not manually by a user.

In addition, for example, the piecewise linear ranges may be defined by a minimum display brightness capability value, a maximum display brightness capability value and/or a step size to determine the supported display brightness capability values. In one example, in piecewise linear ranges, the step size for higher valued ranges of display brightness capability values may be greater than the step size for lower valued ranges of display brightness capability values, as changes in brightness may be less perceptible for higher brightness levels. For example, the piecewise linear ranges may have different step sizes, as two adjacent ranges with the same step size may be considered the same range. In an example, a range may include one level if both the step size is zero and the maximum brightness value is equal to the minimum brightness value, and may be used to support boost levels of a display device 108, 110. For a given range, the minimum value+step size*n can be considered a valid level for non-negative n, where the valid level is equal to or below the range's maximum value, and (maximum value−minimum value) % step size can be zero, where % represents a modulo operation. In one specific example, the display driver 116 can define Range 1 as a normal range [0, 100] with step size of 1 nit, Range 2 as a normal range [105, 350] with a step size of 5 nits, Range 3 as a normal range [360, 400] with a step size of 10 nits, and Range 4 as a boost range [600, 700] with a step size of 100 nits. In this specific example, the ranges of nit values selectable by a user can include the range [0, 400] within the normal ranges (and not boost ranges) defined as 0, 1, . . . , 99, 100, 105, 110, . . . , 345, 350, 360, 370, . . . , 390, 400.

Additionally, for example, the display device(s) 108, 110 can be calibrated in production so the corresponding display driver 116 can substantially accurately convey brightness capabilities of the display device(s) 108, 110. For example, minimum and maximum brightness levels on the display device(s) 108, 110 can be measured in millinits, and a number (e.g., several dozen) color points can be measured to obtain finer calibration data. The calibrated data can be provided to the display driver 116 and taken with an on pixel ratio (OPR) of 100% where each pixel can have a RGB value of (255, 255, 255) or floating point equivalent. Also, the luminance output of the panel can be within 5% of the target for a given requested nits level.

Moreover, there may be one or more detected conditions or other triggers to cause receiving the one or more ranges of display brightness capability values for a given display device 108, 110. For example, display driver 116 may provide the one or more ranges of display brightness capability values to the display level service 112 based on installation of the display driver 116 on the operating system 106, based on initialization of the display driver 116 (e.g., operating system 106 detecting communication from the display device 108, 110 and accordingly loading/executing the associated display driver 116), and/or the like. In any case, display driver 116 can provide the one or more ranges of display brightness capability values to the display level service 112 for generating the level mappings 122, as described.

In method 200, at action 204, for each of the multiple display devices, at least a portion of display brightness capability values in the one or more ranges of display brightness capability values can be mapped to selectable brightness levels in an operating system. In an example, display level service 112, e.g., in conjunction with processor 102, memory 104, operating system 106, etc., can map, for each of the multiple display devices 108, 110, at least a portion of display brightness capability values in the one or more ranges of display brightness capability values to selectable brightness levels in the operating system (e.g., operating system 106). For example, display level service 112 can generate the one or more level mappings 122, which can map the display brightness capability values (e.g., nit values) to the selectable brightness levels. In one example, the selectable brightness levels may be defined based on the specified display brightness capability values in the ranges of display brightness capability values for one or more of the display devices 108, 110, such that each display brightness capability value can be selectable by the operating system 106.

In another example, the selectable brightness levels for the operating system 106 may be defined without consideration of the ranges of display brightness capability values and/or may be less than the number of display brightness capability values indicated by the display driver 116, as configured for a given display device 108, 110. In this example, display level service 112 can generate level mappings 122 that map the selectable brightness levels to certain display brightness capability values in the one or more ranges of display brightness capability values indicated for a given display device 108, 110. In this example, the display level service 112 can attempt to map the selectable brightness levels in the operating system 106 to similar display brightness capability values (e.g., nit values) over multiple display devices 108, 110 to achieve consistency in brightness level across the display devices 108, 110. For example, display level service 112 can map the same display brightness capability values for multiple display devices 108, 110 to a given selectable brightness level, where the multiple display devices 108, 110 support the same display brightness capability value. It is possible, however, that the display devices 108, 110 do not support the same display brightness capability value, in which case the display level service 112 can select, for a given selectable brightness level, display brightness capability values of the multiple display devices 108, 110 that are within a threshold difference of one another. In yet another example, display level service 112 can determine a reference (or target) display brightness capability value for one or more selectable brightness levels, and can associate (e.g., in the level mapping 122) a display brightness capability value of a given display device 108, 110 that is within a threshold difference of (e.g., greater than or less than) the reference display brightness capability value.

In method 200, optionally at action 206, an ambient light and/or color value can be received. In an example, display level service 112, e.g., in conjunction with processor 102, memory 104, operating system 106, etc., can receive (e.g., from the one or more sensors 120) the ambient light value and/or the ambient color value. For example, whiteness perceived by a user can change with ambient light level. Thus, for example, the one or more sensors 120 can be coupled to the device 100 and/or to one or more of the display devices 108, 110 to sense environmental conditions for adjusting the brightness (and/or color) of the display to provide a consistent perception of the display brightness (e.g., whiteness level) where ambient light and/or color near the display device 108, 110 changes. Where the one or more sensors 120 are coupled to the device 100, the sensor(s) 120 can provide one or more values indicating a measurement of ambient light and/or color over a wired or wireless interface to the device 100 (e.g., over a universal serial bus (USB), Firewire, Bluetooth, near field communication (NFC), etc. connection), which can communicate with a sensor device driver (not shown) of the operating system 106. Where the one or more sensors 120 are coupled to the display device 108, 110, the sensor(s) 120 can provide one or more values indicating a measurement of ambient light and/or color over a wired or wireless interface to the device 100 or to the corresponding display device 108, 110, which can provide the one or more values to the device 100 via display driver 116.

In method 200, optionally at action 208, a nits transform can be applied to the one or more ranges of nit values based on the ambient light and/or color value. In an example, display level service 112, e.g., in conjunction with processor 102, memory 104, operating system 106, etc., can apply the nits transform to the one or more ranges of nit values based on the ambient light value and/or the ambient color value. For example, display level service 112 can generate one or more nits transforms 124 based on the ambient light value and/or the ambient color value, which can be applied to the level mappings 122 for one or more of the display devices 108, 110 to modify the nit values associated with one or more of the selectable brightness levels of the operating system 106. For example, the nits transform 124 can be determined as a multiplier based on ambient light and/or color, and applied to each value of the level mapping(s) 122 for an associated display device 108, 110. In another example, the nits transform 124 can be determined as multiple values or multipliers to be applied to each value of the level mapping(s) 122 for an associated display device 108, 110, such that different values in the level mapping(s) 122 may have different transform values applied (e.g., nit values in the lower range may have larger multipliers applied to account for the ambient light than values in higher ranges). In addition, the ambient color may impact the perceived brightness of the display device 108, 110, and may thus be used in determining the nits transform for adjusting the nit values associated to the selectable brightness levels of the operating system 106.

In one example, the display devices 108, 110 can each have an associated sensor 120, where each sensor 120 provides a different measure of ambient light and/or color. In this example, display level service 112 can apply different nits transforms to level mappings 122 for each of the display devices 108, 110. Moreover, as depicted for example, the ambient light and/or color value can be received and the nits transform can be applied as part of mapping the nit values to the selectable brightness levels. In other examples, however, the ambient light and/or color value can be received and/or nits transforms can be accordingly applied at different actions of the method 200 (e.g., when determining the nit value mapped to a selected selectable brightness level, as described herein, etc.). In addition, for example, where display level service 112 detects a change in ambient light and/or color value (e.g., as received via the corresponding sensor 120), for one display device or otherwise, display level service 112 can regenerate the transform(s) 124 and/or apply the new transform(s) 124 to associated level mapping(s) 122.

In method 200, at action 210, one of the selectable brightness levels, selected via the operating system, can be determined. In an example, display level selecting component 118, e.g., in conjunction with processor 102, memory 104, operating system 106, etc., can determine the one of the selectable brightness levels as being selected via the operating system 106. For example, display level selecting component 118 can receive an indication of the selected brightness level from the operating system 106 based on a manual selection via a user interface or based on manual selection via an interface provided by one or more of the display device(s) 108, 110. For example, the display device(s) 108, 110 may include physical buttons, touchscreen interface, or other mechanism for selecting a brightness level, selection of which may be communicated back to the operating system 106. In another example, display level selecting component 118 can receive an indication of the selected brightness level from the operating system 106 based on an automatic selection based on one or more operating system processes, applications executing thereon, etc. (e.g., a power savings event, an ambient light change detection, etc.), and/or the like. In an example, the selected brightness level may correspond to a value on a scale of possible brightness levels of arbitrary units (e.g., 0-100, which may be in certain step sizes, such as 10), which the level mappings 122 may have mapped to actual nit values supported by one or more display devices 108, 110, as described.

For example, one or more detected conditions or triggers at the operating system 106 can result in determining the one of the selected brightness levels, which may include changes in ambient light or color, commands from the operating system 106 services or applications, etc., as described. In one example, the operating system can cycle through increasing and/or decreasing brightness levels to ramp up or down the brightness of the display device 108, 110 (e.g., to provide a more desirable user experience). For each level, the display level service 112 can determine the corresponding nit value (or other display brightness capability value) and instruct the display device 108, 110 to set the nit value (or other display brightness capability value), as described below. Thus, for example, actions 210, 212, 214 may occur a number of times after action 204 (e.g., in a loop). Moreover, in an example, changes in ambient light can result in optional actions 206, 208 being performed during a looping of actions 210, 212, 214 to adjust the transform(s) 124 for the level mapping(s) 122 in selecting the nit value(s), etc. In one example, the display level selecting component 118 may send a transition time to the display driver 116 that instructs to ramp the brightness level linearly (or using another ramping mechanism) to the target brightness in a specific amount of time (e.g., based on specifying corresponding display brightness capability values for given time increments, relative display brightness capability values to step up/down at each time increment, etc.). In this example, the ramping can occur with less calls through the stack to the display driver 116 to conserve power, performance, etc., although in other examples, ramping may include several linear calls to approximate a nonlinear transition. In this example, the linear ramp can then be implemented in the display driver 116, offloaded to a microcontroller/hardware in the display itself, etc.

In method 200, at action 212, for each of the multiple display devices, a corresponding display brightness capability value, mapped to the one of the selectable brightness levels, can be determined. In an example, display level service 112, e.g., in conjunction with processor 102, memory 104, operating system 106, etc., can determine, for each of the multiple display devices, the corresponding display brightness capability value mapped to the one of the selectable brightness levels. For example, the display level service 112 can query the level mapping 122 for each given display device 108, 110 to determine the display brightness capability value mapped to the selectable brightness level. In one example, the display brightness capability value can have been transformed based on an ambient light and/or color value (e.g., specific to the display device 108, 110 or otherwise). In another example, the ambient light and/or color value can be used to transform the determined display brightness capability value that is mapped to the selectable brightness level.

In method 200, at action 214, the corresponding display brightness capability value may be indicated to each of the multiple display devices. In an example, display level service 112, e.g., in conjunction with processor 102, memory 104, operating system 106, etc., can indicate (e.g., via display stack 114, display driver 116, etc.), to each of the multiple display devices 108, 110, the corresponding display brightness capability value. For example, display level service 112 may communicate the instruction in a message to the display stack 114 (e.g., over an interface provided by the display stack 114) to the display device(s) 108, 110 via corresponding display drivers 116, where the display drivers offer an interface for specifying the nits-based brightness value. In an example, the corresponding display brightness capability values for the display devices 108, 110 may be different values due to one or more of the display devices 108, 110 not supporting the same display brightness capability value (and/or a reference display brightness capability value), due to different ambient light and/or color conditions at (or reported for) the given display devices 108, 110, etc. In any case, the display devices 108, 110 can receive the nits-based brightness level and can accordingly set the brightness level to provide a similar perceptible brightness level across the display devices 108, 110. For example, the nits-based brightness value may correspond to a luminance (or lux) value.

In this regard, in one specific example where a manual selection of brightness level is received at an interface provided by a display device 108, information regarding the selected brightness level may be communicated to the operating system 106 (e.g., via a display driver associated with the display device 108). Display level service 112 can map the selected brightness level as a brightness capability value to a selectable brightness level, as described, and can accordingly then map the selectable brightness level to a brightness capability value of one or more other displays 110, which can be communicated to the one or more other displays 110 to effectuate a change in the brightness level based on manual selection via display 108.

FIG. 3 is a flowchart of an example of a method 300 for adjusting a color level of one or more display devices. For example, method 300 can be performed by a device 100, and/or one or more components thereof, to adjust the color level of one or more display devices 108, 110. Moreover, though generally described in terms of multiple display devices herein, device 100 can similarly perform the functions described below for a single display device. In addition, in an example, a given display device may have multiple display panels, and the device 100 can perform the functions described below for each of the multiple display panels.

In method 300, at action 302, for each of multiple display devices, one or more ranges of color values that are supported by a given display device can be received. In an example, display level service 112, e.g., in conjunction with processor 102, memory 104, operating system 106, etc., can receive (e.g., from display driver 116), for each of the multiple display devices (e.g., display devices 108, 110), the one or more ranges of color values that are supported a given display device. For example, a display driver 116 for a given display device may indicate one or more ranges of color values supported by a corresponding display device 108 (or 110), which may be in units of chromaticity (e.g., x, y) values. The one or more ranges may include a linear range, multiple piecewise linear ranges, etc., as described with respect to display brightness capability values.

Moreover, there may be one or more detected conditions or other triggers to cause receiving the one or more ranges of color values for a given display device 108, 110. For example, display driver 116 may provide the one or more ranges of color values to the display level service 112 based on installation of the display driver 116 on the operating system 106, based on initialization of the display driver 116 (e.g., operating system 106 detecting communication from the display device 108, 110 and accordingly loading/executing the associated display driver 116), and/or the like. In any case, display driver 116 can provide the one or more ranges of color values to the display level service 112 for generating the level mappings 122, as described.

In method 300, at action 304, for each of the multiple display devices, at least a portion of color values in the one or more ranges of color values can be mapped to selectable color levels in an operating system. In an example, display level service 112, e.g., in conjunction with processor 102, memory 104, operating system 106, etc., can map, for each of the multiple display devices 108, 110, at least a portion of color values in the one or more ranges of color values to selectable color levels in the operating system (e.g., operating system 106). For example, display level service 112 can generate the one or more level mappings 122, which can map the color values to the selectable color levels. In one example, the selectable color levels may be defined based on the specified color values in the ranges of color values for one or more of the display devices 108, 110, such that each color value can be selectable by the operating system 106.

In another example, the selectable color levels for the operating system 106 may be defined without consideration of the ranges of color values and/or may be less than the number of color values indicated by the display driver 116 as configured for a given display device 108, 110. In this example, display level service 112 can generate level mappings 122 that map the selectable color levels to certain color values in the one or more ranges of color values indicated for a given display device 108, 110. In this example, the display level service 112 can attempt to map the selectable color levels in the operating system 106 to similar color values over multiple display devices 108, 110 to achieve consistency in color level across the display devices 108, 110. For example, display level service 112 can map the same color values for multiple display devices 108, 110 to a given selectable color level, where the multiple display devices 108, 110 support the same color value. It is possible, however, that the display devices 108, 110 do not support the same color value, in which case the display level service 112 can select, for a given selectable color level, color values of the multiple display devices 108, 110 that are within a threshold difference of one another. In yet another example, display level service 112 can determine a reference (or target) color value for one or more selectable color levels, and can associate (e.g., in the level mapping 122) a color value of a given display device 108, 110 that is within a threshold difference of (e.g., greater than or less than) the reference color value.

In method 300, optionally at action 306, an ambient light and/or color value can be received. In an example, display level service 112, e.g., in conjunction with processor 102, memory 104, operating system 106, etc., can receive (e.g., from the one or more sensors 120) the ambient light value and/or the ambient color value. For example, color level perceived by a user can change with ambient light and/or color level. Thus, for example, the one or more sensors 120 can be coupled to the device 100 and/or to one or more of the display devices 108, 110 to sense environmental conditions for adjusting the color level of the display to provide a consistent perception of the display color level where ambient light and/or color near the display device 108, 110 changes. Where the one or more sensors 120 are coupled to the device 100, the sensor(s) 120 can provide one or more values indicating a measurement of ambient light and/or color over a wired or wireless interface to the device 100, which can communicate with a sensor device driver (not shown) of the operating system 106. Where the one or more sensors 120 are coupled to the display device 108, 110, the sensor(s) 120 can provide one or more values indicating a measurement of ambient light and/or color over a wired or wireless interface to the device 100 or to the corresponding display device 108, 110, which can provide the one or more values to the device 100 via display driver 116.

In method 300, optionally at action 308, a color transform can be applied to the one or more ranges of color values based on the ambient light and/or color value. In an example, display level service 112, e.g., in conjunction with processor 102, memory 104, operating system 106, etc., can apply the color transform to the one or more ranges of color values based on the ambient light value and/or the ambient color value. For example, display level service 112 can generate one or more color transforms 124 based on the ambient light value and/or the ambient color value, which can be applied to the level mappings 122 for one or more of the display devices 108, 110 to modify the color values associated with one or more of the selectable color levels of the operating system 106. For example, the color transform 124 can be determined as a multiplier based on ambient light and/or color, and applied to each value of the level mapping(s) 122 for an associated display device 108, 110. In another example, the color transform 124 can be determined as multiple values or multipliers to be applied to each value of the level mapping(s) 122 for an associated display device 108, 110, such that different values in the level mapping(s) 122 may have different transform values applied (e.g., color values in the lower range may have larger multipliers applied to account for the ambient light/color than values in higher ranges).

In one example, the display devices 108, 110 can each have an associated sensor 120, where each sensor 120 provides a different measure of ambient light and/or color. In this example, display level service 112 can apply different color transforms to level mappings 122 for each of the display devices 108, 110. Moreover, as depicted for example, the ambient light and/or color value can be received and the color transform can be applied as part of mapping the color values to the selectable color levels. In other examples, however, the ambient light and/or color value can be received and/or color transforms can be accordingly applied at different actions of the method 300 (e.g., when determining the color value mapped to a selected selectable color level, as described herein, etc.). In addition, for example, where display level service 112 detects a change in ambient light and/or color value (e.g., as received via the corresponding sensor 120), for one display device or otherwise, display level service 112 can regenerate the transform(s) 124 and/or apply the new transform(s) 124 to associated level mapping(s) 122.

In method 300, at action 310, one of the selectable color levels, selected via the operating system, can be determined. In an example, display level selecting component 118, e.g., in conjunction with processor 102, memory 104, operating system 106, etc., can determine the one of the selectable color levels as being selected via the operating system 106. For example, display level selecting component 118 can receive an indication of the selected color level from the operating system 106 based on a manual selection via a user interface or based on manual selection via an interface provided by one or more of the display device(s) 108, 110. For example, the display device(s) 108, 110 may include physical buttons, touch-screen interface, or other mechanism for selecting a color level, selection of which may be communicated back to the operating system 106. In another example, display level selecting component 118 can receive an indication of the selected color level from the operating system 106 based on an automatic selection based on one or more operating system processes, applications executing thereon, etc. (e.g., a power savings event, an ambient light change detection, etc.), and/or the like. In an example, the selected color level may correspond to a value on a scale of possible color levels of arbitrary units (e.g., 0-100, which may be in certain step sizes, such as 10), which the level mappings 122 may have mapped to actual color values supported by one or more display devices 108, 110, as described.

For example, one or more detected conditions or triggers at the operating system 106 can result in determining the one of the selected color levels, which may include changes in ambient light or color, commands from the operating system 106 services or applications, etc., as described. In one example, the operating system can cycle through increasing and/or decreasing color levels to ramp up or down the color level of the display device 108, 110 (e.g., to provide a more desirable user experience). For each level, the display level service 112 can determine the corresponding color level value and instruct the display device 108, 110 to set the color level value, as described below. Thus, for example, actions 310, 312, 314 may occur a number of times after action 304 (e.g., in a loop). Moreover, in an example, changes in ambient light/color can result in optional actions 306, 308 being performed during a looping of actions 310, 312, 314 to adjust the transform(s) 124 for the level mapping(s) 122 in selecting the color level value(s), etc.

In method 300, at action 312, for each of the multiple display devices, a corresponding color value, mapped to the one of the selectable color levels, can be determined. In an example, display level service 112, e.g., in conjunction with processor 102, memory 104, operating system 106, etc., can determine, for each of the multiple display devices, the corresponding color value mapped to the one of the selectable color levels. For example, the display level service 112 can query the level mapping 122 for each given display device 108, 110 to determine the color value mapped to the selectable color level. In one example, the color value can have been transformed based on an ambient light and/or color value (e.g., specific to the display device 108, 110 or otherwise). In another example, the ambient light and/or color value can be used to transform the determined color value that is mapped to the selectable color level.

In method 300, at action 314, the corresponding color value may be indicated to each of the multiple display devices. In an example, display level service 112, e.g., in conjunction with processor 102, memory 104, operating system 106, etc., can indicate (e.g., via display stack 114, display driver 116, etc.), to each of the multiple display devices 108, 110, the corresponding color value. For example, display level service 112 may communicate the instruction in a message to the display stack 114 (e.g., over an interface provided by the display stack 114) to the display device(s) 108, 110 via corresponding display drivers 116, where the display drivers offer an interface for specifying the color value. In an example, the corresponding color values for the display devices 108, 110 may be different values due to one or more of the display devices 108, 110 not supporting the same color value (and/or a reference color value), due to different ambient light and/or color conditions at (or reported for) the given display devices 108, 110, etc. In any case, the display devices 108, 110 can receive the color value and can accordingly set the color level to provide a similar perceptible color level across the display devices 108, 110. For example, the color value may correspond to one or more chromaticity color values.

In this regard, in one specific example where a manual selection of color level is received at an interface provided by a display device 108, information regarding the selected color level may be communicated to the operating system 106 (e.g., via a display driver associated with the display device 108). Display level service 112 can map the selected color level as a color capability value to a selectable color level, as described, and can accordingly then map the selectable color level to a color capability value of one or more other displays 110, which can be communicated to the one or more other displays 110 to effectuate a change in the color level based on manual selection via display 108.

Figure 4:
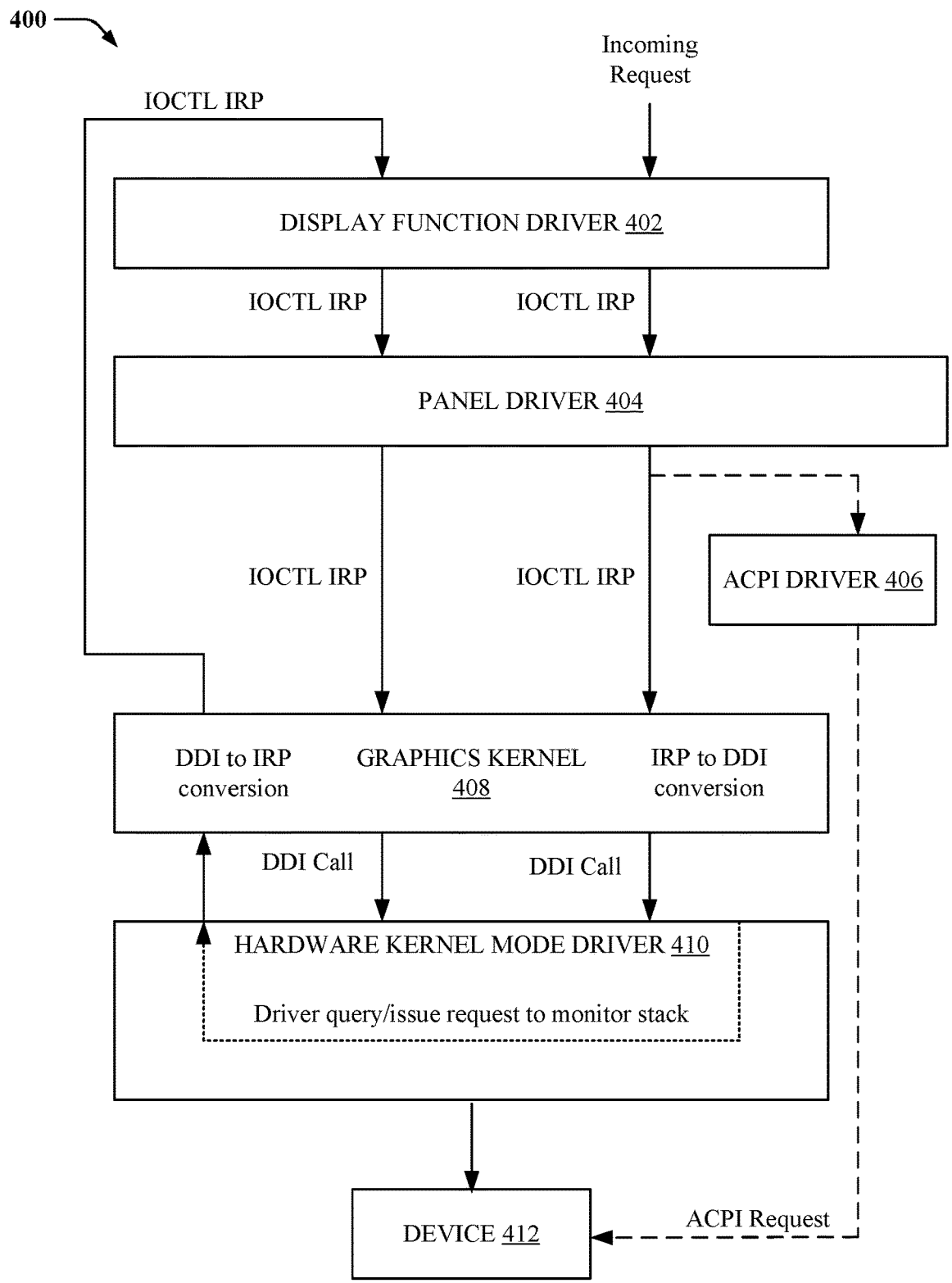
FIG. 4 is a schematic diagram of an example of various operating system components for communicating brightness level adjustment values in accordance with examples described herein.

FIG. 4 illustrates an example of operating system components 400 for adjusting display level parameters of a display device to provide consistency in perceptible display levels across multiple display devices. Operating system components 400 (e.g., provided by an operating system, such as operating system 106) can include a display function driver 402 that can provide a generic display interface for managing communications with different panel drivers 404, an advanced configuration and power interface (ACPI)

driver 406 for managing power control of power consumed by the operating system, a graphics kernel 408 for providing commands (e.g., drawing or other display setting commands) to a hardware kernel mode driver 410 that communicates with a corresponding display device (e.g., display device 108, 110).

In an example, the display function driver 402, which may correspond to display stack 114, can receive (e.g., via a display level service 112) an incoming request to set a nits-based brightness level for a display device. Display function driver 402 can send an input/output control (IOCTL) request packet (IRP) to the panel driver 404 of the corresponding display device to indicate the nits-based brightness level adjustment. The panel driver 404 can similarly send an IOCTL IRP to the graphics kernel 408. Graphics kernel 408 can convert the IOCTL IRP indicating the nits-based brightness level to a device driver interface (DDI) call to the hardware kernel mode driver 410. The IOCTL IRPs can remain pending until the DDI call returns. In addition, the hardware kernel mode driver 410 can instruct the display device 412 to modify the brightness level to the nits-based brightness level adjustment and/or can perform a query to the display device 412 and/or issue another request to the display function driver 402. Alternatively, for example, the panel driver 404 can send the IOCTL IRP to an ACPI driver 406 to apply the nits-based brightness level adjustment. In this example, ACPI driver 406 can send an ACPI request to the display device 412 to effectuate the brightness level adjustment on the display device 412. For example, whether the panel driver 404 sends the IOCTL IRP to the ACPI driver 406 or to the graphics kernel 408 can be dependent on the panel driver 404 implementation.

In the case where the panel driver 404 sends the IOCTL IRP to the graphics kernel 408, when the hardware kernel mode driver 410 operations to set the nits-based brightness level are complete, the hardware kernel mode driver 410 can perform a DDI callback up to the graphics kernel 408. The graphics kernel 408 can convert the DDI callback to an IOCTL IRP, and can block the DDI thread until the IRP completes or returns to the hardware kernel mode driver 410. In this example, graphics kernel 408 can forward the IOCTL IRP to the display function driver 402 to release the IRP. The display function driver 402 can forward the IOCTL IRP to the panel driver 404 to release the IRP, which can forward the IOCTL IRP to the graphics kernel 408 or ACPI driver 406 (e.g., depending on which one initiated the request to adjust the brightness level). Where the graphics kernel 408 initiates the request, graphics kernel 408 can issue a DDI call to the hardware kernel mode driver 410 to release the DDI thread, and can also release the corresponding IOCTL IRP.

Figure 5:
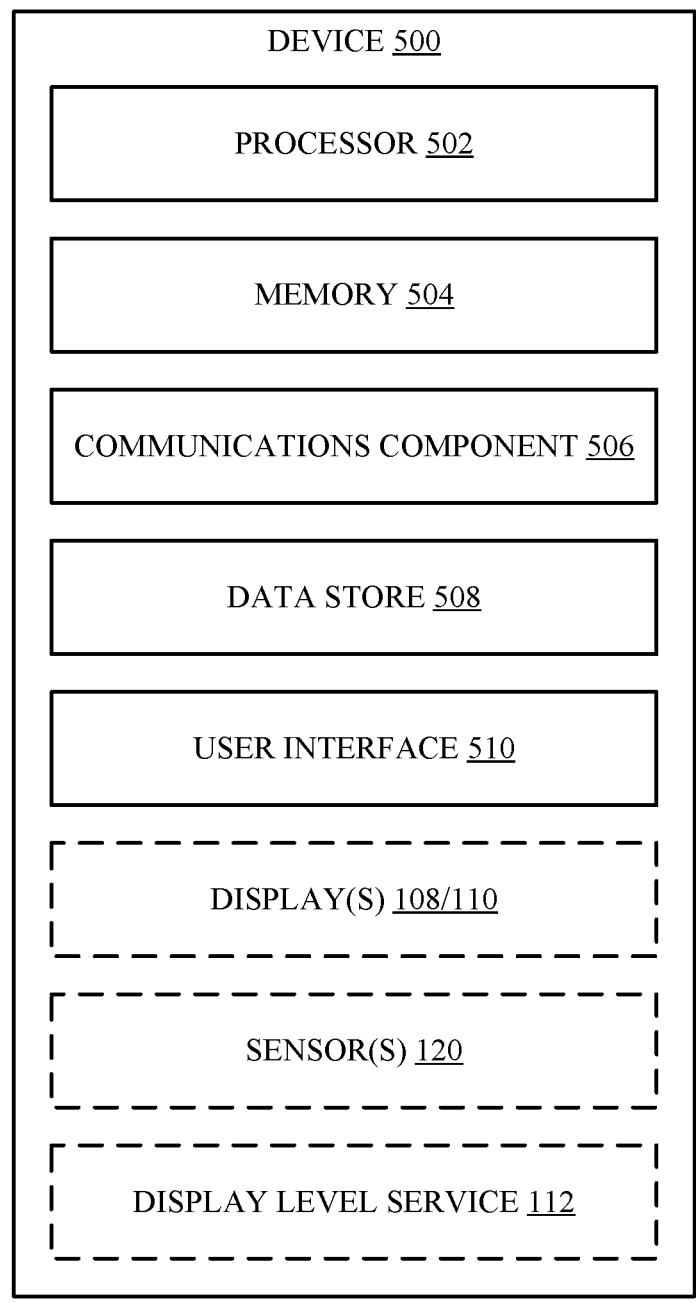
FIG. 5 is a schematic diagram of an example of a device for performing functions described herein.

FIG. 5 illustrates an example of device 500, similar to or the same as device 100 (FIG. 1) including additional optional component details as those shown in FIG. 1. In one implementation, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of applications being executed by processor 502, such as display level service 112, an operating system (or other components thereof), applications, related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc., utilizing hardware, software, and services as described herein. Communications component 506 may carry communications between components on device 500 (e.g., display(s) 108, 110, sensor(s) 120), as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with implementations described herein. For example, data store 508 may be or may include a data repository for applications and/or related parameters (e.g., display level service 112, an operating system (or other components thereof), applications, etc.) not currently being executed by processor 502. In addition, data store 508 may be a data repository for display level service 112, an operating system (or other components thereof), applications, and/or one or more other components of the device 500.

Device 500 may include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include and/or be communicatively coupled with one or more display devices 108, 110, sensor(s) 120, and/or a display level service 112 for adjusting display level parameters, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for adjusting display level properties across multiple display devices, comprising:
   receiving, for each of multiple display devices, one or more ranges of display brightness capability values that are supported by a given display device of the multiple display devices;
   receiving a first ambient light value representing first ambient light conditions near a first one of the multiple displays;
   receiving a second ambient light value representing second ambient light conditions near a second one of the multiple displays;
   applying a first nits transform to the one or more ranges of display brightness capability values for the first one of the multiple displays based at least in part on the first ambient light value;
   applying a second nits transform to the one or more ranges of display brightness capability values for the second one of the multiple displays based at least in part on the second ambient light value;
   mapping, for each of the multiple display devices, at least a portion of display brightness capability values in the one or more ranges of display brightness capability values to selectable brightness levels available in an operating system, wherein mapping at least the portion of the display brightness capability values includes:
      mapping at least the portion of the display brightness capability values in the one or more ranges of display brightness capability values for the first one of the multiple displays, and having the first nits transform applied, to the selectable brightness levels; and
      mapping at least the portion of the display brightness capability values in the one or more ranges of display brightness capability values for the second one of the multiple displays, and having the second nits transform applied, to the selectable brightness levels;
   determining one of the selectable brightness levels selected via the operating system;
   determining, for each of the multiple display devices, a corresponding display brightness capability value mapped to the one of the selectable brightness levels; and
   indicating, to each of the multiple display devices, the corresponding display brightness capability value.

2. The method of claim 1, wherein, for a given one of the multiple display devices, the one or more ranges of display brightness capability values includes a first range of display brightness capability values defined by a first step size for determining first supported display brightness capability values in the first range of display brightness capability values, and a second range of display brightness capability values defined by a second step size for determining second supported display brightness capability values in the second range, wherein the first step size corresponds to a different step size value than the second step size.

3. The method of claim 1, wherein mapping at least the portion of display brightness capability values includes mapping, for the first one of the multiple display devices, at least a first display brightness capability value to the one of the selectable brightness levels, and mapping, for the second one of the multiple display devices, at least a second display brightness capability value to the one of the selectable brightness levels, wherein the first display brightness capability value is different than the second display brightness capability value based at least in part on the first display brightness capability value not being within the one or more ranges of display brightness capability values defined for the second one of the multiple display devices.

4. The method of claim 1, further comprising:
   receiving, for each of the multiple display devices, one or more ranges of color values that are supported by a given display device of the multiple display devices;
   mapping, for each of the multiple display devices, at least a portion of color values in the one or more ranges of color values to selectable color levels available in the operating system;
   determining one of the selectable color levels selected via the operating system;
   determining, for each of the multiple display devices, a corresponding color value mapped to the one of the selectable color levels; and
   indicating, to each of the multiple display devices, the corresponding color value.

5. The method of claim 4, further comprising:
   receiving an ambient color value representing ambient color conditions near at least one of the multiple displays; and
   applying a color transform to the one or more ranges of color values for the one of the multiple displays based at least in part on the ambient color value, wherein mapping at least the portion of the color values includes mapping at least the portion of the color values in the one or more ranges of color values for the one of the multiple displays, and having the color transform applied, to the selectable color levels.

6. The method of claim 5, further comprising:

applying a nits transform to the one or more ranges of display brightness capability values for the one of the multiple displays based at least in part on the ambient color value, wherein mapping at least the portion of the display brightness capability values includes mapping at least the portion of the display brightness capability values in the one or more ranges of display brightness capability values for the one of the multiple displays, and having the nits transform applied, to the selectable brightness levels.

7. A device for adjusting display level properties across multiple display devices, comprising:

a memory storing one or more parameters or instructions for adjusting the display level properties; and at least one processor coupled to the memory, wherein the at least one processor is configured to:

receive, for each of multiple display devices communicatively coupled to the device, one or more ranges of display brightness capability values that are supported by a given display device of the multiple display devices;

receive a first ambient light value representing first ambient light conditions near a first one of the multiple displays;

receive a second ambient light value representing second ambient light conditions near a second one of the multiple displays;

apply a first nits transform to the one or more ranges of display brightness capability values for the first one of the multiple displays based at least in part on the first ambient light value;

apply a second nits transform to the one or more ranges of display brightness capability values for the second one of the multiple displays based at least in part on the second ambient light value;

map, for each of the multiple display devices, at least a portion of display brightness capability values in the one or more ranges of display brightness capability values to selectable brightness levels available in an operating system, wherein the at least one processor is configured to map at least the portion of the display brightness capability values by:

mapping at least the portion of the display brightness capability values in the one or more ranges of display brightness capability values for the first one of the multiple displays, and having the first nits transform applied, to the selectable brightness levels; and mapping at least the portion of the display brightness capability values in the one or more ranges of display brightness capability values for the second one of the multiple displays, and having the second nits transform applied, to the selectable brightness levels;

determine one of the selectable brightness levels selected via the operating system;

determine, for each of the multiple display devices, a corresponding display brightness capability value mapped to the one of the selectable brightness levels; and indicate, to each of the multiple display devices, the corresponding display brightness capability value.

8. The device of claim 7, wherein, for a given one of the multiple display devices, the one or more ranges of display brightness capability values includes a first range of display brightness capability values defined by a first step size for determining first supported display brightness capability values in the first range of display brightness capability values, and a second range of display brightness capability values defined by a second step size for determining second supported display brightness capability values in the second range, wherein the first step size corresponds to a different step size value than the second step size.

9. The device of claim 7, wherein the at least one processor is configured to map, for the first one of the multiple display devices, at least a first display brightness capability value to the one of the selectable brightness levels, and map, for the second one of the multiple display devices, at least a second display brightness capability value to the one of the selectable brightness levels, wherein the first display brightness capability value is different than the second display brightness capability value based at least in part on the first display brightness capability value not being within the one or more ranges of display brightness capability values defined for the second one of the multiple display devices.

10. The device of claim 7, wherein the at least one processor is further configured to:

receive, for each of the multiple display devices, one or more ranges of color values that are supported by a given display device of the multiple display devices;

map, for each of the multiple display devices, at least a portion of color values in the one or more ranges of color values to selectable color levels available in the operating system;

determine one of the selectable color levels selected via the operating system;

determine, for each of the multiple display devices, a corresponding color value mapped to the one of the selectable color levels; and indicate, to each of the multiple display devices, the corresponding color value.

11. The device of claim 10, wherein the at least one processor is further configured to:

receive an ambient color value representing ambient color conditions near at least one of the multiple displays; and apply a color transform to the one or more ranges of color values for the one of the multiple displays based at least in part on the ambient color value, wherein the at least one processor is configured to map at least the portion of the color values in the one or more ranges of color values for the one of the multiple displays, and having the color transform applied, to the selectable color levels.

12. The device of claim 11, wherein the at least one processor is further configured to:

apply a nits transform to the one or more ranges of display brightness capability values for the one of the multiple displays based at least in part on the ambient color value, wherein the at least one processor is configured to map at least the portion of the display brightness capability values in the one or more ranges of display brightness capability values for the one of the multiple displays, and having the nits transform applied, to the selectable brightness levels.

13. A non-transitory computer-readable medium, comprising code executable by one or more processors for adjusting display level properties across multiple display devices, the code comprising code for:
receiving, for each of multiple display devices, one or more ranges of display brightness capability values that are supported by a given display device of the multiple display devices;
receiving a first ambient light value representing first ambient light conditions near a first one of the multiple displays;
receiving a second ambient light value representing second ambient light conditions near a second one of the multiple displays;
applying a first nits transform to the one or more ranges of display brightness capability values for the first one of the multiple displays based at least in part on the first ambient light value;
applying a second nits transform to the one or more ranges of display brightness capability values for the second one of the multiple displays based at least in part on the second ambient light value;
mapping, for each of the multiple display devices, at least a portion of display brightness capability values in the one or more ranges of display brightness capability values to selectable brightness levels available in an operating system, wherein mapping at least the portion of the display brightness capability values includes:
mapping at least the portion of the display brightness capability values in the one or more ranges of display brightness capability values for the first one of the multiple displays, and having the first nits transform applied, to the selectable brightness levels; and
mapping at least the portion of the display brightness capability values in the one or more ranges of display brightness capability values for the second one of the multiple displays, and having the second nits transform applied, to the selectable brightness levels;
determining one of the selectable brightness levels selected via the operating system;
determining, for each of the multiple display devices, a corresponding display brightness capability value mapped to the one of the selectable brightness levels; and
indicating, to each of the multiple display devices, the corresponding display brightness capability value.

14. The non-transitory computer-readable medium of claim 13, wherein, for a given one of the multiple display devices, the one or more ranges of display brightness capability values includes a first range of display brightness capability values defined by a first step size for determining first supported display brightness capability values in the first range of display brightness capability values, and a second range of display brightness capability values defined by a second step size for determining second supported display brightness capability values in the second range, wherein the first step size corresponds to a different step size value than the second step size.

15. The non-transitory computer-readable medium of claim 13, wherein the code for mapping maps, for the first one of the multiple display devices, at least a first display brightness capability value to the one of the selectable brightness levels, and maps, for the second one of the multiple display devices, at least a second display brightness capability value to the one of the selectable brightness levels, wherein the first display brightness capability value is different than the second display brightness capability value based at least in part on the first display brightness capability value not being within the one or more ranges of display brightness capability values defined for the second one of the multiple display devices.

16. The non-transitory computer-readable medium of claim 13, further comprising code for:
receiving, for each of the multiple display devices, one or more ranges of color values that are supported by a given display device of the multiple display devices;
mapping, for each of the multiple display devices, at least a portion of color values in the one or more ranges of color values to selectable color levels available in the operating system;
determining one of the selectable color levels selected via the operating system;
determining, for each of the multiple display devices, a corresponding color value mapped to the one of the selectable color levels; and
indicating, to each of the multiple display devices, the corresponding color value.

17. The non-transitory computer-readable medium of claim 16, further comprising code for:
receiving an ambient color value representing ambient color conditions near at least one of the multiple displays; and
applying a color transform to the one or more ranges of color values for the one of the multiple displays based at least in part on the ambient color value,
wherein the code for mapping maps at least the portion of the color values in the one or more ranges of color values for the one of the multiple displays, and having the color transform applied, to the selectable color levels.

18. The non-transitory computer-readable medium of claim 17, further comprising code for:
applying a nits transform to the one or more ranges of display brightness capability values for the one of the multiple displays based at least in part on the ambient color value,
wherein the code for mapping maps at least the portion of the display brightness capability values includes mapping at least the portion of the display brightness capability values in the one or more ranges of display brightness capability values for the one of the multiple displays, and having the nits transform applied, to the selectable brightness levels.

* * * * *